United States Patent
Zhang et al.

(10) Patent No.: US 12,155,638 B2
(45) Date of Patent: Nov. 26, 2024

(54) METHOD AND SYSTEM FOR CONSTRUCTING FUSION COVERT CHANNEL

(71) Applicant: TANGSHAN UNIVERSITY, Tangshan (CN)

(72) Inventors: Xiaosong Zhang, Tangshan (CN); Linhong Guo, Tangshan (CN)

(73) Assignee: TANGSHAN UNIVERSITY, Tangshan (CN)

( * ) Notice: Subject to any disclaimer, the term of this patent is extended or adjusted under 35 U.S.C. 154(b) by 69 days.

(21) Appl. No.: 17/907,398

(22) PCT Filed: Nov. 9, 2021

(86) PCT No.: PCT/CN2021/129583
§ 371 (c)(1),
(2) Date: Sep. 26, 2022

(87) PCT Pub. No.: WO2022/105645
PCT Pub. Date: May 27, 2022

(65) Prior Publication Data
US 2023/0275880 A1      Aug. 31, 2023

(30) Foreign Application Priority Data
Nov. 23, 2020   (CN) .................. 202011317532.X

(51) Int. Cl.
H04L 9/40        (2022.01)
(52) U.S. Cl.
CPC .............. H04L 63/0485 (2013.01)

(58) Field of Classification Search
CPC ................................................ H04L 63/0485
(Continued)

(56) References Cited

U.S. PATENT DOCUMENTS 6,917,974 B1    7/2005  Stytz et al.
9,626,522 B1*   4/2017  Flowers, Jr. .......... G06F 21/577
(Continued)

FOREIGN PATENT DOCUMENTS

| CN | 110690942 A | 1/2020 |
|---|---|---|
| CN | 110838913 A | 2/2020 |
| CN | 112291267 A | 1/2021 |

OTHER PUBLICATIONS

Murdoch, et al., "Embedding Covert Channels into TCP/IP", 2005, Springer, Information Hiding, pp. 247-261. (Year: 2005).*

(Continued)

*Primary Examiner* — Michael S McNally
(74) *Attorney, Agent, or Firm* — Stanek Lemon Crouse & Meeks PA

(57) ABSTRACT

The present disclosure relates to a method and system for constructing a fusion covert channel. A time covert channel is constructed by rearranging data packets of different terminals in the Internet of Things in a manner of carrying secret information, a storage covert channel is constructed by replacing a TCP sequence number field of a data packet with secret information, and a fusion covert channel is constructed by fusing the time covert channel and the storage covert channel. In this way, advantages of the two channels can be complemented, so that covertness of the fusion covert channel is improved and a capacity of the covert channel is increased.

10 Claims, 2 Drawing Sheets

(58) Field of Classification Search
USPC .......................................................... 713/160
See application file for complete search history.

(56) References Cited

U.S. PATENT DOCUMENTS

| | | | | |
|---|---|---|---|---|
| 2014/0254797 | A1* | 9/2014 | Piotrowska | H04L 69/22 |
| | | | | 380/255 |
| 2020/0389469 | A1* | 12/2020 | Litichever | H04W 4/40 |
| 2022/0393893 | A1* | 12/2022 | Chen | G06F 16/2379 |

OTHER PUBLICATIONS

International Search Report and Written Opinion for PCT/CN2021/129583 with international filing date Nov. 9, 2021, and mailed on Jan. 20, 2022.

* cited by examiner

METHOD AND SYSTEM FOR CONSTRUCTING FUSION COVERT CHANNEL

CROSS REFERENCE TO RELATED APPLICATIONS

This patent application is a 35 U.S.C. § 371 national stage application of International Patent Application No. PCT/CN2021/129583, filed on Nov. 9, 2021, which claims the benefit and priority of Chinese Patent Application No 202011317532.X, entitled "METHOD AND SYSTEM FOR CONSTRUCTING FUSION COVERT CHANNEL" filed with the Chinese Patent Office on Nov. 23, 2020, the disclosures of which are incorporated by reference herein in their entirety as part of the present application.

TECHNICAL FIELD

The present disclosure relates to the field of information transmission, and in particular, to a method and system for constructing a fusion covert channel.

BACKGROUND ART

With the unprecedented rapid development of the Internet of Things, user privacy and data security are threatened by the technological development while the Internet of Things brings obvious benefits. How to enjoy the convenient services provided by the Internet of Things without the threat of privacy and data disclosure has become an important security issue. Because the boundaries of the Internet of Things are permeable and difficult to defend against external threats, privacy protection and data transmission security are huge obstacles to the popularization of the Internet of Things technology. In view of this, covert channels can be a secure and effective method for transmitting confidential information hidden in the untrusted Internet of Things.

The covert channels are hidden communication paths and are not expected to exist in original creation of a communication system. The covert channels are classified into a storage covert channel and a time covert channel. The storage covert channel means that a sender writes a storage location and a receiver reads the storage location, while the time covert channel means that the sender modulates a covert message into a time behavior and then the receiver decodes the covert message.

Compared with typical Internet devices, Internet of Things devices generate less network traffic, and therefore it is generally considered that the traffic may not be suitable for covert transmission. So far, few studies have been devoted to the construction of covert channels in the context of the Internet of Things. Therefore, there is an urgent need for a method for constructing a covert channel in the context of the Internet of Things.

SUMMARY

The present disclosure aims to provide a method and system for constructing a fusion covert channel, to improve a capacity and covertness of a covert channel more effectively by converging a time covert channel and a storage covert channel.

In order to achieve the above objective, the present disclosure provides the following solutions:

A method for constructing a fusion covert channel is provided, where the method includes:

obtaining the number of different source addresses of data packets in a current cache, where the different source addresses represent different source terminals of the data packets collected by a sender;

arranging data packets with different source addresses into a first permutation segment according to an order in which the data packets enter the cache, and rearranging the data packets in the first permutation segment according to L-bit secret information in the secret information to be carried, to obtain a second permutation segment, where the L-bit secret information is determined according to the number of data packets with different source addresses;

replacing m-bit information in a Transmission Control Protocol (TCP) sequence number field of the first data packet in the second permutation segment with the number of data packets with different source addresses, where a value of m is determined according to the number $N_t$ of terminals connected to the sender;

determining, according to a required capacity of a covert channel, whether to replace m-bit information in TCP sequence number fields of other data packets in the second permutation segment except the first data packet with remaining secret information, where the remaining secret information is other secret information except the L-bit secret information; and if the m-bit information is replaced with the remaining secret information, setting the $(m+1)^{th}$ bit in the TCP sequence number field of the first data packet in the second permutation segment to "1", and performing the step of "replacing m-bit information in a TCP sequence number field of each of the other data packets in the second permutation segment except the first data packet with the remaining secret information and/or padding information"; otherwise, setting the $(m+1)^{th}$ bit in the TCP sequence number field of the first data packet in the second permutation segment to "0", and performing the step of "sending data packets in the second permutation segment to a receiver";

replacing the m-bit information in the TCP sequence number field of each of the other data packets in the second permutation segment except the first data packet with the remaining secret information and/or padding information, where the padding information is expressed by a special value agreed upon by the sender and the receiver;

sending the data packets in the second permutation segment to the receiver; and judging whether covert transmission of all the secret information is completed, and if the transmission is completed, ending covert communication; or if not, obtaining the number of data packets with different source addresses at a next moment, and continuing to perform the step of "arranging data packets with different source addresses into a first permutation segment according to an order in which the data packets enter the cache".

Optionally, the carried secret information is code corresponding to a permutation order of the data packets in the second permutation segment, and a one-to-one correspondence between the permutation order and the code is agreed upon by the sender and the receiver before information is sent.

Optionally, the number of bits of the secret information is $L=\lfloor \log_2 n! \rfloor$, where n represents the number of data packets with different source addresses. A size of the m-bit information is $m=\lceil \log_2 N_t \rceil$.

Optionally, the determining, according to a required capacity of a covert channel, whether to replace m-bit information in TCP sequence number fields of other data packets in the second permutation segment except the first data packet with remaining secret information specifically includes: when the required capacity of the covert channel is greater than a channel capacity of a covert channel constructed by rearranging the data packets, replacing the m-bit information in the TCP sequence number fields of the other data packets with the remaining secret information; otherwise, skipping replacing the m-bit information in the TCP sequence number fields of the other data packets with the remaining secret information.

Optionally, the replacing m-bit information in a TCP sequence number field of each of the other data packets in the second permutation segment except the first data packet with the remaining secret information and/or padding information specifically includes:

when the number of bits of the remaining secret information is greater than or equal to a sum of m bits in the TCP sequence number fields of the other data packets in the second permutation segment except the first data packet, replacing the m-bit information in the TCP sequence number field of each of the other data packets in the second permutation segment except the first data packet with the remaining secret information; or when the number of bits of the remaining secret information is less than a sum of m bits in the TCP sequence number fields of the other data packets in the second permutation segment except the first data packet, successively replacing information with the same number of bits of the TCP sequence number fields of the other data packets in the second permutation segment except the first data packet with the remaining secret information according to a data bit order of the remaining secret information, and replacing, with the padding information, information that is in other fields of data packets in the second permutation segment and that is not replaced with secret information.

The present disclosure further provides a system for constructing a fusion covert channel, where the system includes:

a source address number obtaining module, configured to obtain the number n of different source addresses of data packets in a current cache, where the different source addresses represent different source terminals of the data packets collected by a sender;

a data packet arrangement module, configured to: arrange data packets with different source addresses into a first permutation segment according to an order in which the data packets enter the cache, and rearrange the data packets in the first permutation segment according to L-bit secret information in the secret information to be carried, to obtain a second permutation segment, where the L-bit secret information is determined according to the number of data packets with different source addresses;

an m-bit information replacing module, configured to replace m-bit information in a TCP sequence number field of the first data packet in the second permutation segment with the number of data packets with different source addresses, where a value of m is determined according to the number $N_t$ of terminals connected to the sender;

a secret information determining module, configured to: determine, according to a required capacity of a covert channel, whether to replace m-bit information in TCP sequence number fields of other data packets in the second permutation segment except the first data packet with remaining secret information, where the remaining secret information is other secret information except the L-bit secret information; and if the m-bit information is replaced with the remaining secret information, set the $(m+1)^{th}$ bit in the TCP sequence number field of the first data packet in the second permutation segment to "1", and perform the step of "replacing m-bit information in a TCP sequence number field of each of the other data packets in the second permutation segment except the first data packet with the remaining secret information and/or padding information"; otherwise, set the $(m+1)^{th}$ bit in the TCP sequence number field of the first data packet in the second permutation segment to "0", and perform the step of "sending data packets in the second permutation segment to a receiver";

a replacing module, configured to replace the m-bit information in the TCP sequence number field of each of the other data packets in the second permutation segment except the first data packet with the remaining secret information and/or padding information, where the padding information is expressed by a special value agreed upon by the sender and the receiver;

a sending module, configured to send the data packets in the second permutation segment to the receiver; and a secret information judging module, configured to judge whether covert transmission of all the secret information is completed, and if the transmission is completed, end covert communication; or if not, obtain the number of data packets with different source addresses at a next moment, and continue to perform the step of "arranging data packets with different source addresses into a first permutation segment according to an order in which the data packets enter the cache".

According to the specific embodiments provided in the present disclosure, the present disclosure discloses the following technical effects:

(1) The present disclosure has strong covertness. In the present disclosure, data packets of different terminals in the Internet of Things are rearranged in a manner of carrying secret information, which is very difficult for an attacker to detect covert channels in an application scenario of the Internet of Things containing a large number of terminal data packets. In addition, because group rearrangement is performed through a permutation segment, a value of each permutation segment varies with an actual transmission process, and the value is transmitted by using a storage covert channel, thereby further improving covertness of the fusion covert channel.

(2) The present disclosure has a high capacity. Although network traffic of the Internet of Things is not high, there are generally a lot of Internet terminals in the Internet of Things, and the number of covert information bits in each permutation segment caused by the rearrangement of data packets of different terminals in the present disclosure is large, thereby improving a capacity of the covert channel. In addition, if network communication quality is good, m-bit secret information can be replaced with other packets in each permutation segment except the first data packet, thereby further increasing the capacity of the covert channel.

BRIEF DESCRIPTION OF THE DRAWINGS

The present disclosure will be further described below with reference to the accompanying drawings.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

The present disclosure aims to provide a method and a system for constructing a fusion covert channel, to improve a capacity and covertness of a covert channel more effectively by converging a time covert channel and a storage covert channel.

Nowadays, with the increasing popularity of the Internet of Things, a large number of heterogeneous Internet of Things devices are connected to the Internet, and increasingly vulnerable to network attacks from a security perspective. In this scenario, a network covert channel, as a means of covert information transmission, is covertly sent to a destination through a communication network by embedding secret information in network traffic. Since network traffic of the Internet of Things is relatively small, a fusion covert channel can cover covert transmission by extending covert bits between different types of data covert technologies, which can not only improve covertness, but also improve a capacity of a covert channel. The fusion covert channel provided in the present disclosure is composed of a time covert channel constructed by rearranging data packets of different terminals in the Internet of Things to hide secret information and a storage covert channel constructed by replacing a TCP sequence number field of a data packet with secret information, and parameter information of the time covert channel is transmitted with the assistance of the storage covert channel. Such a fusion covert channel can adapt to application scenarios of the Internet of Things, and can flexibly adjust a embedding capacity of secret information according to actual needs and communication network quality. This is an effective secure transmission method in the Internet of Things environment.

According to the fusion covert channel provided in the present disclosure, more Internet terminals in the Internet of things are used to make up for the less network traffic, so that the constructed fusion covert channel can achieve a high capacity. In addition, a plurality of distributed terminals also make it more difficult to detect a covert channel. More importantly, convergence of a time covert channel and a storage covert channel increases a capacity and covertness of a covert channel more effectively.

To make the objectives, features, and advantages of the present disclosure more comprehensible, the following further describes in detail the present disclosure with reference to the accompanying drawings and specific implementations.

Embodiment 1

Figure 1:
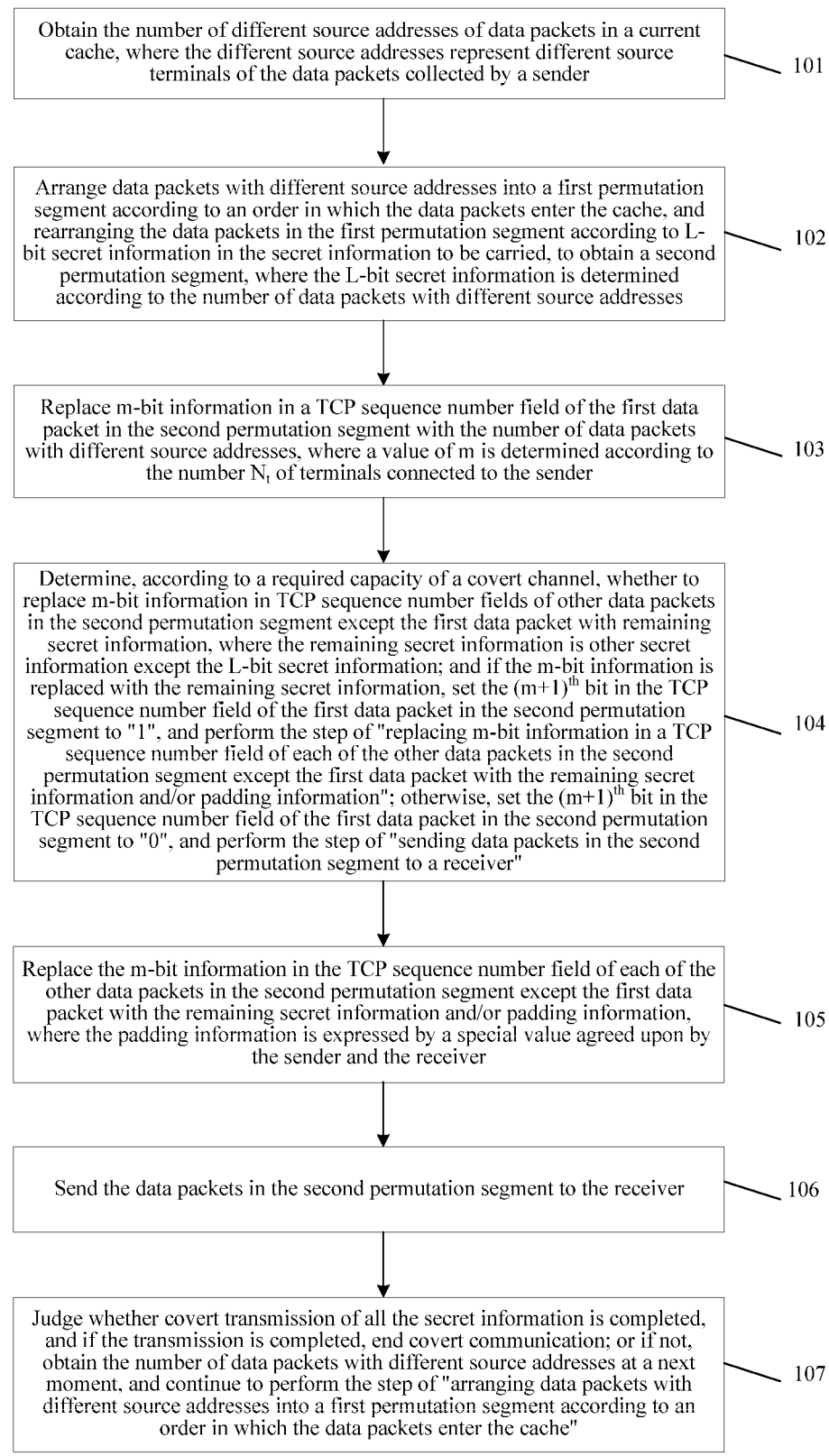
FIG. 1 is a flowchart of a method for constructing a fusion covert channel according to Embodiment 1 of the present disclosure.

This embodiment provides a method for constructing a fusion covert channel. As shown in FIG. 1, the method includes the following steps.

Step 101: Obtain the number of different source addresses of data packets in a current cache, where the different source addresses represent different source terminals of the data packets collected by a sender.

Step 102: Arrange data packets with different source addresses into a first permutation segment according to an order in which the data packets enter the cache, and rearranging the data packets in the first permutation segment according to L-bit secret information in the secret information to be carried, to obtain a second permutation segment, where the L-bit secret information is determined according to the number of data packets with different source addresses.

The carried secret information is code corresponding to a permutation order of the data packets in the second permutation segment, and a one-to-one correspondence between the permutation order and the code is agreed upon by the sender and the receiver before information is sent. The number of bits of the secret information is $L=\lfloor \log_2 n! \rfloor$, where n represents the number of data packets with different source addresses.

For example, if n=3, that is, there are only three data packets with different source addresses in a current permutation segment, there are 3!=6 permutation sequences, and each permutation sequence can hide $\lfloor \log_2 3! \rfloor$=2-bit secret information. In this case, a sender and a receiver can agree in advance on a one-to-one correspondence between a permutation order of data packets and a coding scheme: a data packet permutation "$P_1 P_2 P_3$" represents "00", a permutation "$P_1 P_3 P_2$" represents "01", and both a permutation "$P_2 P_1 P_3$" and a permutation "$P_2 P_3 P_1$" represent "10", and both a permutation "$P_3 P_1 P_2$" and a permutation "$P_3 P_2 P_1$" represent "11". Therefore, when secret information to be carried by the sender is "01", a permutation of the data packet in the second permutation segment may be set to "$P_1 P_3 P_2$". After receiving the data packet, the receiver may automatically decrypt the data packet to the secret information "01". This step is a process of constructing a time covert channel.

Step 103: Replace m-bit information in a TCP sequence number field of the first data packet in the second permutation segment with the number of data packets with different source addresses, where a value of m is determined according to the number $N_t$ of terminals connected to the sender.

A value of m in the m-bit information is $m=\lceil \log_2 N_t \rceil$.

It should be noted that the number $N_t$ of terminals herein is the total number of terminals connected to the sender, but not all terminals send data. The data packets in the current cache are sent by a terminal that has sent data, and the number of terminals that have sent data is n, that is, $n \leq N_t$.

Step 104: Determine, according to a required capacity of a covert channel, whether to replace m-bit information in TCP sequence number fields of other data packets in the second permutation segment except the first data packet with remaining secret information, where the remaining secret information is other secret information except the L-bit secret information; and if the m-bit information is replaced with the remaining secret information, set the $(m+1)^{th}$ bit in the TCP sequence number field of the first data packet in the second permutation segment to "1", and perform the step of "replacing m-bit information in a TCP sequence number field of each of the other data packets in the second permutation segment except the first data packet with the remaining secret information and/or padding information"; otherwise, set the $(m+1)^{th}$ bit in the TCP sequence number field of the first data packet in the second permutation segment to "0", and perform the step of "sending data packets in the second permutation segment to a receiver".

Specifically, when the required capacity of the covert channel is greater than a channel capacity of a covert channel constructed by rearranging the data packets, the m-bit information in the TCP sequence number fields of the other data packets is replaced with the remaining secret information; otherwise, the m-bit information in the TCP sequence number fields of the other data packets is not replaced with the remaining secret information.

For example, the sender requires quantitative secret information to be sent within a specified time period, and the capacity of the previously constructed time covert channel cannot meet this requirement. In this case, if the required capacity of the covert channel is greater than the capacity of the covert channel constructed by rearranging the data packets, a storage covert channel needs to be used together to replace the secret information in the data packet, to expand the capacity of the covert channel and meet a requirement of covert communication.

Step 105: Replace the m-bit information in the TCP sequence number field of each of the other data packets in the second permutation segment except the first data packet with the remaining secret information and/or padding information, where the padding information is expressed by a special value agreed upon by the sender and the receiver.

Specifically, when the number of bits of the remaining secret information is greater than or equal to a sum of m bits ((n−1)×m bits) in the TCP sequence number fields of the other data packets in the second permutation segment except the first data packet, the m-bit information in the TCP sequence number field of each of the other data packets in the second permutation segment except the first data packet is replaced with the remaining secret information; or when the number of bits of the remaining secret information is less than a sum of m bits in the TCP sequence number fields of the other data packets in the second permutation segment except the first data packet, information with the same number of bits of the TCP sequence number fields of the other data packets in the second permutation segment except the first data packet is successively replaced with the remaining secret information according to a data bit order of the remaining secret information, and information that is in other fields of data packets in the second permutation segment and that is not replaced with secret information is replaced with the padding information. This step is to construct a fusion covert channel.

For example, when the number of bits of the remaining secret information is 70 bits, and the capacity sum of m-bit information in the TCP sequence number fields of the other data packets except the first data packet is 100 bits, the information with the same number of bits of the TCP sequence number fields of the other data packets in the second permutation segment is first successively replaced with the 70 bits of the remaining secret information according to the data bit order of the remaining secret information, and then the information that is in the other fields of the data packets in the second permutation segment and that is not replaced with the remaining secret information is replaced with the padding information.

Step 106: Send the data packets in the second permutation segment to the receiver.

Step 107: Judge whether covert transmission of all the secret information is completed, and if the transmission is completed, end covert communication; or if not, obtain the number of data packets with different source addresses at a next moment, and continue to perform the step of "arranging data packets with different source addresses into a first permutation segment according to an order in which the data packets enter the cache".

According to the fusion covert channel provided in this embodiment, more Internet terminals in the Internet of things are used to make up for less network traffic, so that the constructed fusion covert channel can achieve a high capacity. In addition, a plurality of distributed terminals also make it more difficult to detect a covert channel. More importantly, convergence of a time covert channel and a storage covert channel increases a capacity and covertness of a covert channel more effectively.

Embodiment 2

Figure 2:
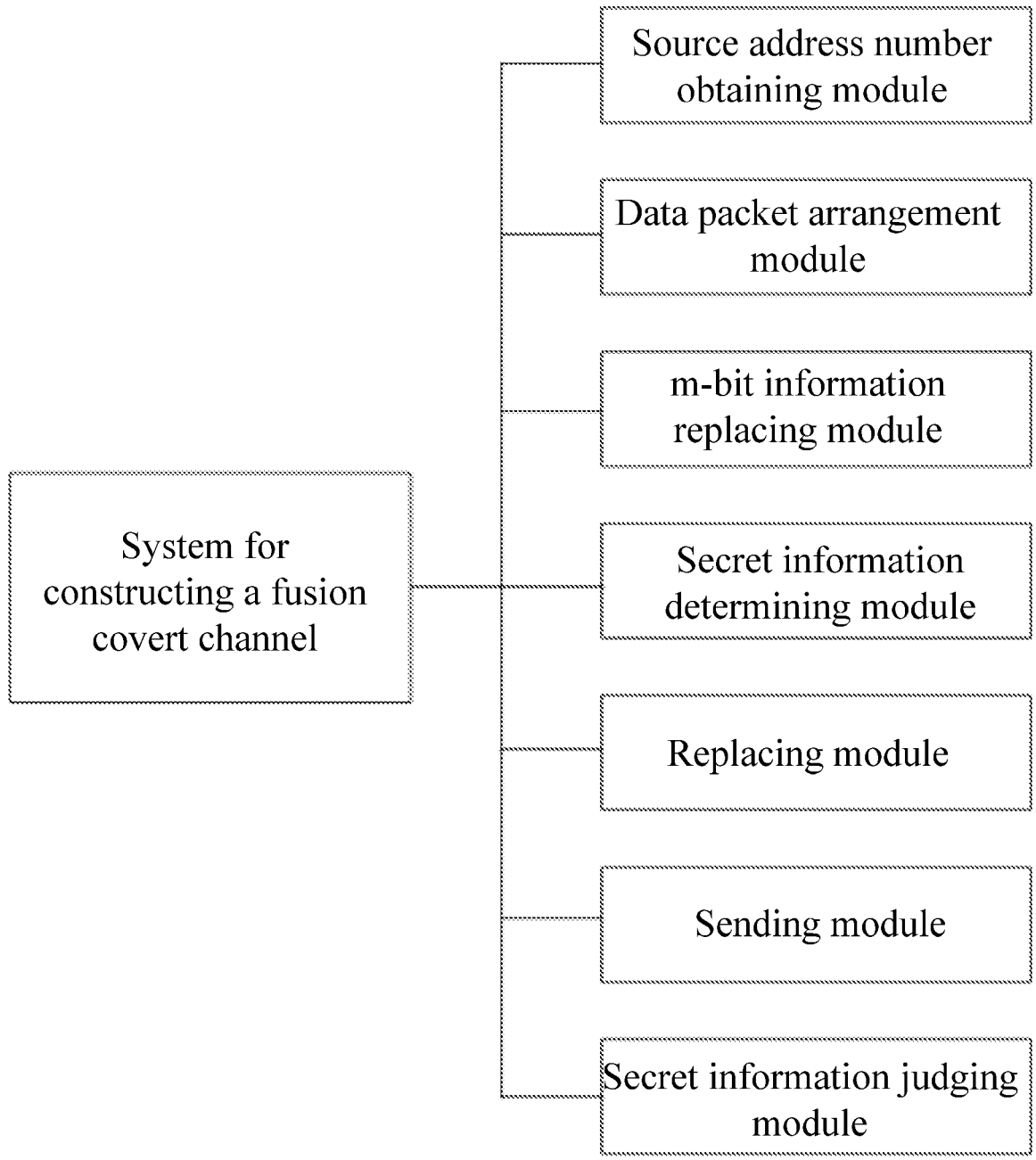
FIG. 2 is a schematic structural diagram of a system for constructing a fusion covert channel according to Embodiment 2 of the present disclosure.

This embodiment provides a system for constructing a fusion covert channel. As shown in FIG. 2, the system includes:

a source address number obtaining module, configured to obtain the number n of different source addresses of data packets in a current cache, where the different source addresses represent different source terminals of the data packets collected by a sender;

a data packet arrangement module, configured to: arrange data packets with different source addresses into a first permutation segment according to an order in which the data packets enter the cache, and rearrange the data packets in the first permutation segment according to L-bit secret information in the secret information to be carried, to obtain a second permutation segment, where the L-bit secret information is determined according to the number of data packets with different source addresses;

an m-bit information replacing module, configured to replace m-bit information in a TCP sequence number field of the first data packet in the second permutation segment with the number of data packets with different source addresses, where a value of m is determined according to the number $N_t$ of terminals connected to the sender;

a secret information determining module, configured to: determine, according to a required capacity of a covert channel, whether to replace m-bit information in TCP sequence number fields of other data packets in the second permutation segment except the first data packet with remaining secret information, where the remaining secret information is other secret information except the L-bit secret information; and if the m-bit information is replaced with the remaining secret information, set the $(m+1)^{th}$ bit in the TCP sequence number field of the first data packet in the second permutation segment to "1", and perform the step of "replacing m-bit information in a TCP sequence number field of each of the other data packets in the second permutation segment except the first data packet with the remaining secret information and/or padding information"; otherwise, set the $(m+1)^{th}$ bit in the TCP sequence number field of the first data packet in the second permutation segment to "0", and perform the step of "sending data packets in the second permutation segment to a receiver";

a replacing module, configured to replace the m-bit information in the TCP sequence number field of each of the other data packets in the second permutation segment except the first data packet with the remaining secret information or the remaining secret information and the padding information, where the padding information is expressed by a special value agreed upon by the sender and the receiver;

a sending module, configured to send the data packets in the second permutation segment to the receiver; and a secret information judging module, configured to judge whether covert transmission of all the secret information is completed, and if the transmission is completed, end covert communication; or if not, obtain the number of data packets with different source addresses at a next moment, and continue to perform the step of "arranging data packets with different source addresses into a first permutation segment according to an order in which the data packets enter the cache".

The replacement module includes a remaining secret information replacing module and a remaining secret information and padding information replacing module. The remaining secret information replacing module is configured to: when the number of bits of the remaining secret information is greater than or equal to a sum of m bits in the TCP sequence number fields of the other data packets in the second permutation segment except the first data packet, replace the m-bit information in the TCP sequence number field of each of the other data packets in the second permutation segment except the first data packet with the remaining secret information.

The remaining secret information and padding information replacing module is configured to: when the number of bits of the remaining secret information is less than a sum of m bits in the TCP sequence number fields of the other data packets in the second permutation segment except the first data packet, successively replace information with the same number of bits of the TCP sequence number fields of the other data packets in the second permutation segment except the first data packet with the remaining secret information according to a data bit order of the remaining secret information, and replace, with the padding information, information that is in other fields of data packets in the second permutation segment and that is not replaced with secret information.

Specific examples are used in this specification to describe the principle and implementation manners of the present disclosure. The foregoing embodiments are merely intended to help understand the method and idea of the present disclosure. In addition, with respect to the implementation manners and the application scope, modifications may be made by a person of ordinary skill in the art according to the idea of the present disclosure. In conclusion, the content of this specification shall not be construed as a limitation on the present disclosure.

What is claimed is:

1. A method for constructing a fusion covert channel, wherein the method comprises:
    obtaining the number of different source addresses of data packets in a current cache, wherein the different source addresses represent different source terminals of the data packets collected by a sender;
    arranging data packets with different source addresses into a first permutation segment according to an order in which the data packets enter the cache, and rearranging the data packets in the first permutation segment according to L-bit secret information in the secret information to be carried, to obtain a second permutation segment, wherein the L-bit secret information is determined according to the number of data packets with different source addresses;
    replacing m-bit information in a Transmission Control Protocol (TCP) sequence number field of the first data packet in the second permutation segment with the number of data packets with different source addresses, wherein a value of m is determined according to the number $N_t$ of terminals connected to the sender;
    determining, according to a required capacity of a covert channel, whether to replace m-bit information in TCP sequence number fields of other data packets in the second permutation segment except the first data packet with remaining secret information, wherein the remaining secret information is other secret information except the L-bit secret information; and if the m-bit information is replaced with the remaining secret information, setting the $(m+1)^{th}$ bit in the TCP sequence number field of the first data packet in the second permutation segment to "1", and performing the step of "replacing m-bit information in a TCP sequence number field of each of the other data packets in the second permutation segment except the first data packet with the remaining secret information and/or padding information"; otherwise, setting the $(m+1)^{th}$ bit in the TCP sequence number field of the first data packet in the second permutation segment to "0", and performing the step of "sending data packets in the second permutation segment to a receiver";
    replacing the m-bit information in the TCP sequence number field of each of the other data packets in the second permutation segment except the first data packet with the remaining secret information and/or the padding information, wherein the padding information is expressed by a special value agreed upon by the sender and the receiver;
    sending the data packets in the second permutation segment to the receiver; and
    judging whether covert transmission of all the secret information is completed, and if the transmission is completed, ending covert communication; or if not, obtaining the number of data packets with different source addresses at a next moment, and continuing to perform the step of "arranging data packets with different source addresses into a first permutation segment according to an order in which the data packets enter the cache".

2. The method for constructing a fusion covert channel according to claim 1, wherein the carried secret information is code corresponding to a permutation order of the data packets in the second permutation segment, and a one-to-one correspondence between the permutation order and the code is agreed upon by the sender and the receiver before information is sent.

3. The method for constructing a fusion covert channel according to claim 1, wherein the number of bits of the secret information is $L=\lfloor \log_2 n \rfloor$, wherein n represents the number of data packets with different source addresses.

4. The method for constructing a fusion covert channel according to claim 1, wherein a size of the m-bit information is $m=\lceil \log_2 N_t \rceil$.

5. The method for constructing a fusion covert channel according to claim 1, wherein the determining, according to a required capacity of a covert channel, whether to replace m-bit information in TCP sequence number fields of other data packets in the second permutation segment except the first data packet with remaining secret information specifically comprises: when the required capacity of the covert channel is greater than a channel capacity of a covert channel constructed by rearranging the data packets, replacing the m-bit information in the TCP sequence number fields of the other data packets with the remaining secret information; otherwise, skipping replacing the m-bit information in the TCP sequence number fields of the other data packets with the remaining secret information.

6. The method for constructing a fusion covert channel according to claim 1, wherein the replacing m-bit information in a TCP sequence number field of each of the other data packets in the second permutation segment except the first data packet with the remaining secret information and/or padding information specifically comprises:

when the number of bits of the remaining secret information is greater than or equal to a sum of m bits in the TCP sequence number fields of the other data packets in the second permutation segment except the first data packet, replacing the m-bit information in the TCP sequence number field of each of the other data packets in the second permutation segment except the first data packet with the remaining secret information.

7. The method for constructing a fusion covert channel according to claim 1, wherein the replacing m-bit information in a TCP sequence number field of each of the other data packets in the second permutation segment except the first data packet with the remaining secret information and/or padding information specifically comprises:

when the number of bits of the remaining secret information is less than a sum of m bits in the TCP sequence number fields of the other data packets in the second permutation segment except the first data packet, successively replacing information with the same number of bits of the TCP sequence number fields of the other data packets in the second permutation segment except the first data packet with the remaining secret information according to a data bit order of the remaining secret information, and replacing, with the padding information, information that is in other fields of data packets in the second permutation segment and that is not replaced with secret information.

8. A system for constructing a fusion covert channel, wherein the system comprises:

a source address number obtaining module, configured to obtain the number n of different source addresses of data packets in a current cache, wherein the different source addresses represent different source terminals of the data packets collected by a sender;

a data packet arrangement module, configured to: arrange data packets with different source addresses into a first permutation segment according to an order in which the data packets enter the cache, and rearrange the data packets in the first permutation segment according to L-bit secret information in the secret information to be carried, to obtain a second permutation segment, wherein the L-bit secret information is determined according to the number of data packets with different source addresses;

an m-bit information replacing module, configured to replace m-bit information in a TCP sequence number field of the first data packet in the second permutation segment with the number of data packets with different source addresses, wherein a value of m is determined according to the number Nt of terminals connected to the sender;

a secret information determining module, configured to: determine, according to a required capacity of a covert channel, whether to replace m-bit information in TCP sequence number fields of other data packets in the second permutation segment except the first data packet with remaining secret information, wherein the remaining secret information is other secret information except the L-bit secret information; and if the m-bit information is replaced with the remaining secret information, set the $(m+1)^{th}$ bit in the TCP sequence number field of the first data packet in the second permutation segment to "1", and perform the step of "replacing m-bit information in a TCP sequence number field of each of the other data packets in the second permutation segment except the first data packet with the remaining secret information and/or padding information"; otherwise, set the $(m+1)^{th}$ bit in the TCP sequence number field of the first data packet in the second permutation segment to "0", and perform the step of "sending data packets in the second permutation segment to a receiver";

a replacing module, configured to replace the m-bit information in the TCP sequence number field of each of the other data packets in the second permutation segment except the first data packet with the remaining secret information or the remaining secret information and the padding information, wherein the padding information is expressed by a special value agreed upon by the sender and the receiver;

a sending module, configured to send the data packets in the second permutation segment to the receiver; and a secret information judging module, configured to judge whether covert transmission of all the secret information is completed, and if the transmission is completed, end covert communication; or if not, obtain the number of data packets with different source addresses at a next moment, and continue to perform the step of "arranging data packets with different source addresses into a first permutation segment according to an order in which the data packets enter the cache".

9. The system for constructing a fusion covert channel according to claim 8, wherein the replacing module comprises a remaining secret information replacing module, and the remaining secret information replacing module is configured to: when the number of bits of the remaining secret information is greater than or equal to a sum of m bits in the TCP sequence number fields of the other data packets in the second permutation segment except the first data packet, replace the m-bit information in the TCP sequence number field of each of the other data packets in the second permutation segment except the first data packet with the remaining secret information.

10. The system for constructing a fusion covert channel according to claim 8, wherein the replacement module comprises a remaining secret information and padding information replacing module, and the remaining secret information and padding information replacing module is configured to: when the number of bits of the remaining secret information is less than a sum of m bits in the TCP sequence number fields of the other data packets in the second permutation segment except the first data packet, successively replace information with the same number of bits of the TCP sequence number fields of the other data packets in the second permutation segment except the first data packet with the remaining secret information according to a data bit order of the remaining secret information, and replace, with the padding information, information that is in other fields of data packets in the second permutation segment and that is not replaced with secret information.

* * * * *